Figure 1:
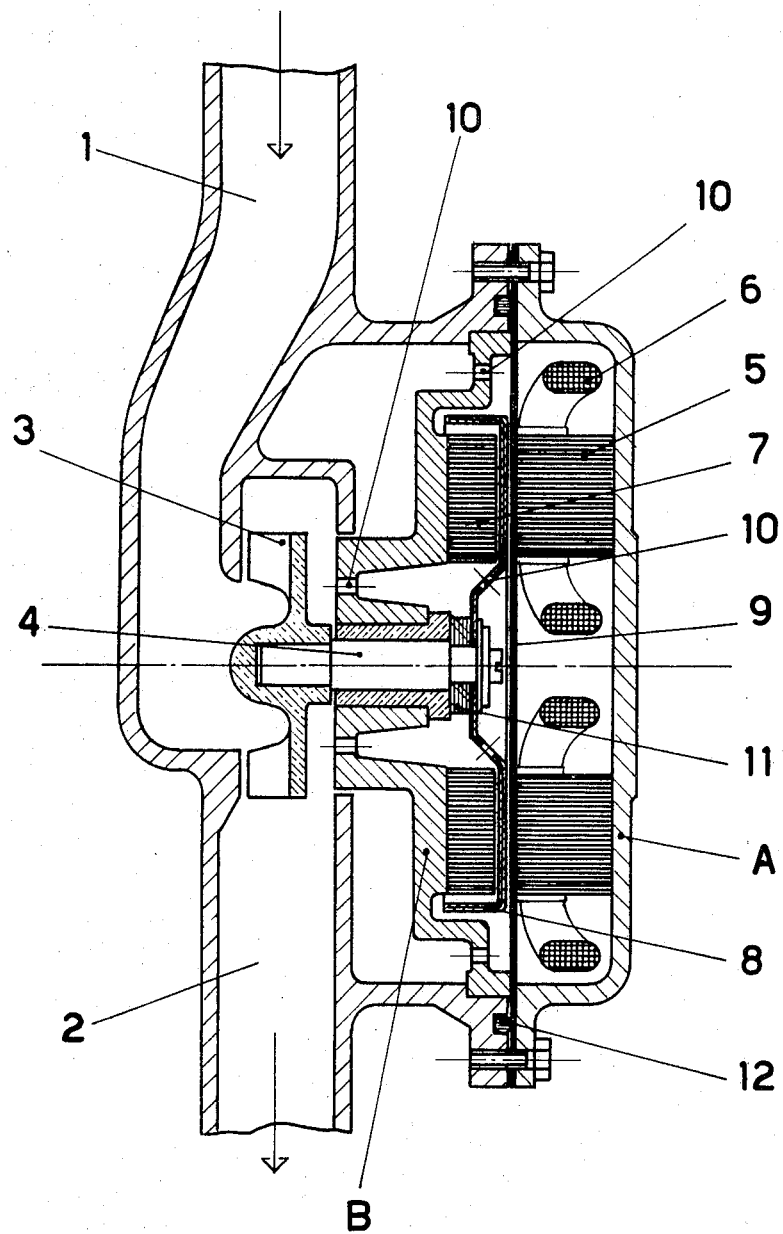

United States Patent [19]

Signorile

[11] 3,767,330
[45] Oct. 23, 1973

[54] ELECTRIC HOT WATER CIRCULATING PUMP WITH MOTOR HAVING AN AXIAL AIR GAP

[75] Inventor: Marco Signorile, Milan, Italy

[73] Assignee: Ercole Marelli & C.S.p.A., Rome, Italy

[22] Filed: Aug. 20, 1971

[21] Appl. No.: 173,362

[30] Foreign Application Priority Data
June 5, 1971 Italy.............................. 25471 A/71
Apr. 28, 1970 Italy.............................. 29121 A/70

[52] U.S. Cl. .................................................. 417/420
[51] Int. Cl. ............................................... F04b 35/00
[58] Field of Search ................... 417/420, 348-356, 417/357, 410; 310/268, 86

[56] References Cited
UNITED STATES PATENTS

| | | | |
|---|---|---|---|
| 1,590,025 | 6/1926 | Hall | 310/172 |
| 1,737,128 | 11/1929 | Ross | 310/160 |
| 2,846,951 | 9/1958 | Metral et al. | 417/420 |
| 2,693,140 | 11/1954 | White | 417/410 |
| 1,780,337 | 11/1930 | Canton | 417/357 |
| 2,248,030 | 7/1941 | Zwack | 417/420 |
| 3,220,349 | 11/1965 | White | 417/357 |
| 3,378,710 | 4/1968 | Martin | 417/420 |
| 3,420,184 | 1/1969 | Englesberg | 417/420 |
| 3,429,137 | 2/1969 | Law | 417/420 |
| 547,069 | 10/1895 | Gorges | 310/268 |
| 2,378,556 | 6/1945 | Jeffers | 310/268 |
| 2,512,346 | 10/1947 | Lenehan | 310/268 |
| 2,730,953 | 1/1956 | Pensabene | 417/420 |
| 2,782,721 | 2/1957 | White | 310/268 |
| 3,060,337 | 10/1962 | Henry-Bandot | 310/268 |
| 3,069,577 | 12/1962 | Lee | 310/268 |
| 3,304,450 | 2/1967 | Bosco | 310/268 |
| 3,333,544 | 8/1967 | Turk | 310/86 |
| 3,355,914 | 12/1967 | Venema | 310/268 |

FOREIGN PATENTS OR APPLICATIONS

| | | | |
|---|---|---|---|
| 748,708 | 5/1956 | Great Britain | 417/420 |
| 978,683 | 12/1964 | Great Britain | 417/420 |
| 995,386 | 8/1951 | France | 417/420 |
| 1,502,641 | 10/1967 | France | 417/420 |
| 1,527,434 | 4/1968 | France | 310/160 |

Primary Examiner—William L. Freeh
Attorney—Morton Amster et al.

[57] ABSTRACT

In an electric pump used for the circulation of hot water the inductor of the moor is formed by a stator of the front type and the armature consists of a fixed magnetic part and a movable disc of material having a high conductivity keyed onto the end of the shaft, onto the opposite end of which the pump impeller is keyed.

By separating in this manner the electrical circuit of the rotor from the magnetic circuit the axial thrust is eliminated.

7 Claims, 2 Drawing Figures

ELECTRIC HOT WATER CIRCULATING PUMP WITH MOTOR HAVING AN AXIAL AIR GAP

The electric pumps used for the circulation of hot water in heating systems and for the distribution of hot water in household premises are comprised, in their most widespread form at present, of a centrifugal pump actuated by an asynchronous motor whose cage rotor is immersed in the same water circulating in the pump.

The main object of this construction is to avoid leakages of water to the exterior as a consequence of using seals between fixed and rotating parts with reduction to a minimum of the static torque at starting.

The basic problem which must be solved however in the construction of these electric pumps, lies in the separation of the rotary part of the motor, immersed in the liquid, from the static part which must necessarily be dry in order to preserve the winding insulation.

This separation can be obtained in a particularly simple and safe manner by using motors of the axial air gap type, because in this case for the separation between rotor and stator a flat diaphragm arranged in the air gap is sufficient, while the sealing members are reduced to those normally used in reliably fluidtight and lasting flange joints.

Unfortunately axial air gap motors have a thrust which acts in the direction of the axis of rotation on account of the attraction occurring between the magnetic packs or stacks of stator and rotor.

The magnitude of this thrust is considerable and the operation of the motors can be achieved only on the condition that there are provided suitable mechanical support members for taking up the axial thrust.

When it is not possible to use ball bearings, and this is the case with motors for the above-mentioned circulation pumps, it is necessary to have recourse to constructional complications and limitations which cancel out the advantages obtainable with these types of motor.

The present invention relates to an electric hot water circulating pump operated by a special motor with axial air gap, completely without axial thrust which has, therefore, all the advantages of this type of motor for the particular application but without having its disadvantages.

More particularly the electric hot water circulating pump in accordance with the invention is characterised in that it is comprised of a centrifugal pump operated by an asynchronous motor, whose inductor if formed by a stator of the front type and whose armature consists of a fixed magnetic part and of a movable disc of material with high conductivity keyed onto the end of shaft, onto the opposite end of which the pump impeller is keyed.

The elimination of the axial thrust is achieved in accordance with the invention by separating the electrical rotor circuit from the magnetic circuit. The electrical rotor circuit is the only rotary part of the motor free to rotate, keyed onto the shaft, while the magnetic circuit is fixed.

The attraction occurring between the magnetic stator and rotary parts is therefore taken up by the casing of said rigid and non-deformable parts, while the rotary part having no magnetic material does not undergo attraction or repulsion in axial direction.

This rotary part is formed by a disc of material having good conductivity, drawn and shaped for the purpose of increasing the mechanical strength.

The rotor disc is fitted and locked onto the shaft which supports the pump impeller and is kept at a fixed distance from the front surface of the magnetic part by the axial thrust produced by the pump opposed by a suitable backing washer.

In accordance with a feature of the invention the magnetic part of the armature is comprised of a magnetic stack obtained by a spirally wound strip of steel sheet.

It has been found however that it was possible to obtain a notable saving in the construction of the magnetic part of the armature.

Therefore in accordance with another feature of the invention the magnetic part of the armature is formed from the same material used for the construction of the shield which holds it and produced by forming and machining simultaneously with the shield itself.

According to a further feature of the invention the material used for the construction of the shield and of the magnetic part of the armature is constituted by cast iron.

According to yet another feature of the invention the material used for the construction of these parts is constituted by sintered steel.

Figure 2:
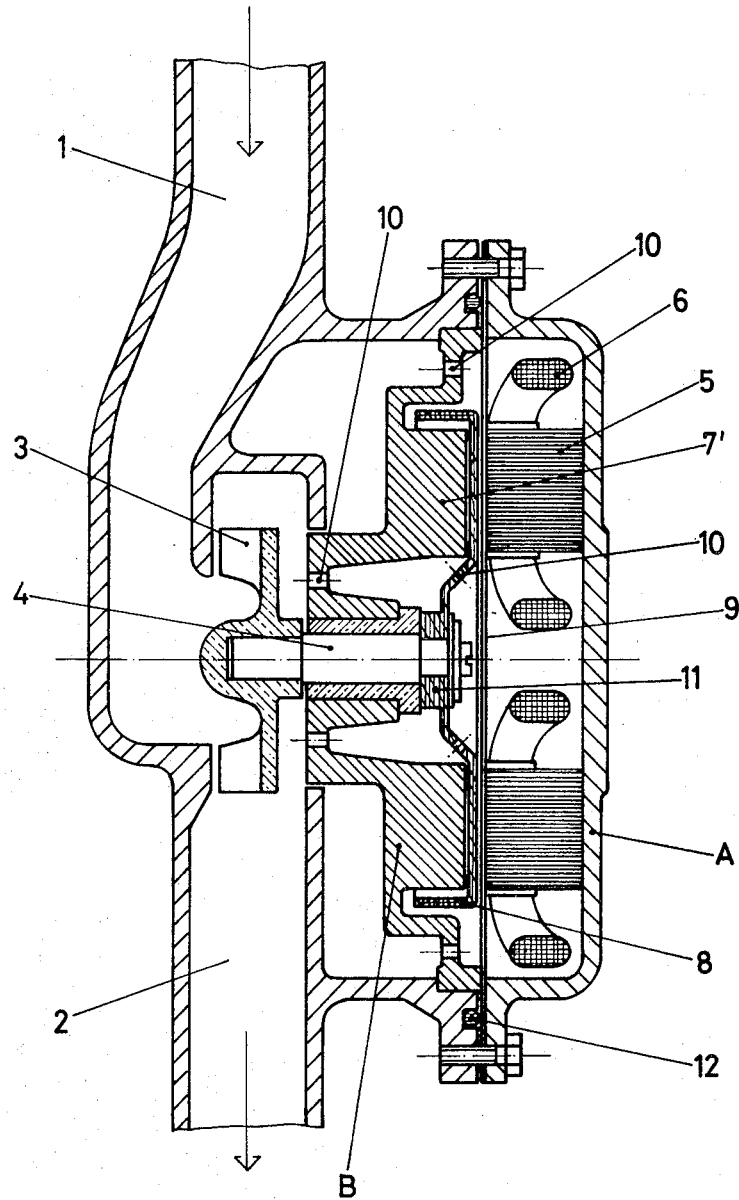

The invention will be understood more clearly from the following description of two of its embodiments, with reference to the attached drawings, in which:

FIG. 1 shows diagrammatically a section through an electric pump in accordance with the invention along the axis of rotation; and FIG. 2 shows the same section in another embodiment.

Referring first to FIG. 1, in which 1 designates the intake or suction duct and 2 the exhaust duct of the pump, 3 designates the impeller and 4 the shaft common to the rotor and to the impeller, 5 indicates the stator (primary) of the motor in whose radial slots there is arranged the winding 6. The secondary or armature of the motor is formed by the fixed magnetic part 7 and by the rotary part 8, consisting of a disc of material having good conductivity, suitably shaped as shown in the diagram and keyed onto the shaft 4.

The magnetic part 7 consists of a spirally wound strip of steel sheet.

Both the magnetic stator part 5 and the magnetic part 7 of the armature are rigidly fixed to the respective metal support parts A and B.

The attraction between the magnetic parts is therefore taken up by the aforesaid support parts which are fixed and interlocked.

In FIG. 1 there are also indicated by 12 the sealing rings of flexible material, and by 9 the separation diaphragm between the parts submerged in the liquid and the dry static part, this diaphragm consisting of a thin sheet of non-magnetic material of high resistivity.

There are designated by 10 the holes or ports communicating between the pump circuit and the chamber containing the motor rotor, which holes have the purpose together with those provided in the rotary disc in the proximity of the hub, of balancing the pressures and allowing a circulation of liquid inside the motor under the centrifugal action of the rotating part.

The advantages of the above-mentioned construction concern: economy in construction, easy assembling and disassembling for overhaul and cleaning, reliability of operation combined with exceptional quietness and long life.

The economy in construction is clearly apparent from a simple inspection of the constructional diagram of FIG. 1 which shows the presence of only one support for the shaft, with dimensions reduced to a minimum, which carries at one end the rotary part of the motor and at the opposite end the pump impeller, the constructional simplicity of the armature of the motor, whose rotating part is reduced to a simple shaped disc, while the fixed part is formed by a spirally wound sheet strip, and the simplicity of the members separating the submerged part of the motor from the dry part.

In the same FIG.1 it can be seen how the entire stator part can easily be detached and removed from the remaining part of the electric pump, how the rotary part of the motor can be removed by loosening a single screw and how all the remaining assembly of shaft, impeller and associated support, can be removed leaving in place the piping and the volute. It is obvious how the easy disassembly for access to the internal parts can ensure an easy cleaning and overhaul and therefore reliability in operation.

The special form of the disc-type rotor assures a degree of quietness in the operation of the motor which cannot be achieved with rotors of conventional form with rotor cage arranged inside the slots. The life of the electric pump which is essentially due to the life of the bearings, to the life of the tightness of the stator part and to the life of the winding insulation, is ensured by the minimal weight of the rotary part, by the efficiency and simplicity of the separation system between the part of the motor immersed in water and the dry parts, by the reliable manufacturing of the windings in a stator of the front type and by the possibility of replacing all the air gaps between windings and earth, by filling the stator cavity with a suitable termosetting resin. The shape of the parts of the motor in contact with the liquid makes these parts adapted to be built in a simple, rational and inexpensive manner with stainless materials, so as to reduce the corrosion which the presence of the liquid can tend to cause to negligible values.

The electric pump shown in FIG. 2 differs from that in FIG.1 only as regards the magnetic part of the armature. As for the rest it is identical to that in FIG.1 and therefore its description will not be repeated.

The magnetic part 7 is solid and made with the same material as that used for the shield B which holds it, and it is produced by forming and machining simultaneously with the shield, tha material employed preferably being cast iron or sintered steel.

It is obvious that by a construction of this type of the magnetic part of the armature a notable saving in the manufacture and assembly of the magnetic part with respect to the embodiment in FIG.1, is obtained.

I claim:

1. An electric pump for the circulation of liquid including a pump impeller which is positioned within a housing and operated by an asynchronous motor, said motor comprising first and second axially-spaced, fixed magnetic stators, a shaft mounting said pump impeller on one end thereof, a disc mounted on the other end of said shaft for rotation between said first and second magnetic stators, said rotating disc having an axially extending flange at its periphery and a depression formed in the central portion thereof, said flange surrounding a portion of said first magnetic stator.

2. An electric pump in accordance with claim 1 wherein said first magnetic stator is supported by a shield having a central hub, said shield being provided with holes at its periphery and in the central hub of said shield, said rotating disc including holes formed in said depression, wherein in said shield holes and said disc holes balance the pressure of water circulating inside the pump.

3. An electric pump in accordance with claim 2 including a sealing diaphragm located between said second magnetic stator and said rotating disc.

4. An electric pump in accordance with claim 3 wherein said first magnetic stator is formed from a roll of rustproof steel having magnetic properties.

5. An electric pump in accordance with claim 3 wherein said first magnetic stator and said shield are formed of the same material.

6. An electric pump in accordance with claim 5 wherein said shield and said first magnetic stator are formed from cast iron.

7. An electric pump in accordance with claim 5 wherein said shield and said first magnetic stator are formed from sintered steel.

* * * * *

UNITED STATES PATENT OFFICE
CERTIFICATE OF CORRECTION

Patent No. 3,767,330          Dated October 23, 1973

Inventor(s) MARCO SIGNORILE

It is certified that error appears in the above-identified patent and that said Letters Patent are hereby corrected as shown below:

In the priority date, "April 28, 1970" is changed to --August 28, 1970--.

Signed and sealed this 29th day of April 1975.

SEAL)
Attest:

RUTH C. MASON
Attesting Officer

C. MARSHALL DANN
Commissioner of Patents
and Trademarks